(12) United States Patent
Klein

(10) Patent No.: US 11,677,573 B2
(45) Date of Patent: Jun. 13, 2023

(54) CONTACTLESS POE CONNECTOR AND CONTACTLESS POE CONNECTION SYSTEM

(71) Applicant: Phoenix Contact GmbH & Co. KG, Blomberg (DE)

(72) Inventor: Daniel Klein, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/269,838

(22) PCT Filed: Aug. 21, 2019

(86) PCT No.: PCT/EP2019/072387
§ 371 (c)(1),
(2) Date: Feb. 19, 2021

(87) PCT Pub. No.: WO2020/039004
PCT Pub. Date: Feb. 27, 2020

(65) Prior Publication Data
US 2021/0336653 A1    Oct. 28, 2021

(30) Foreign Application Priority Data
Aug. 24, 2018   (DE) .......................... 102018120779.4

(51) Int. Cl.
*H04L 12/10* (2006.01)
*H04B 5/00* (2006.01)
(Continued)

(52) U.S. Cl.
CPC ............. *H04L 12/10* (2013.01); *H02J 50/10* (2016.02); *H04B 5/0031* (2013.01); *H04B 5/0037* (2013.01); *H02J 50/05* (2016.02)

(58) Field of Classification Search
CPC .............................. H04B 3/548; H04B 5/0031
See application file for complete search history.

(56) References Cited

U.S. PATENT DOCUMENTS

| 7,331,793 B2 | 2/2008 | Hernandez et al. |
| 9,644,763 B2 | 5/2017 | Flucke |
(Continued)

FOREIGN PATENT DOCUMENTS

| CN | 107786346 A | 3/2018 |
| CN | 207706271 U | 8/2018 |
(Continued)

OTHER PUBLICATIONS

Authorized Officer: Ganis, Alexander, International Search Report issued in counterpart PCT application No. PCT/EP2019/072387, dated Nov. 5, 2019, 22 pp.
(Continued)

*Primary Examiner* — Diana J. Cheng
(74) *Attorney, Agent, or Firm* — Kaplan Breyer Schwarz, LLP

(57) ABSTRACT

A contactless PoE connection system and a contactless PoE connector for use in the connection system, in which the contactless PoE connector has a first contactless interface configured for bidirectional data transfer, a second contactless interface configured for unidirectional power transfer, and a third interface to which a first Ethernet line can be connected. The third interface is configured to receive data and power, which are to be transferred jointly via the Ethernet line. Furthermore, a data and power splitting device are connected to the first, second, and third interfaces, which splitting device is configured for splitting power and data as applied to the third interface and for selectively supplying data to the first contactless interface and for selectively supplying power to the second contactless interface.

6 Claims, 2 Drawing Sheets

(51) Int. Cl.
*H02J 50/10* (2016.01)
*H02J 50/05* (2016.01)

(56) References Cited

U.S. PATENT DOCUMENTS

| | | | |
|---|---|---|---|
| 9,680,213 | B2 | 6/2017 | Pan et al. |
| 9,853,746 | B2 | 12/2017 | Mccormack et al. |
| 2004/0245855 | A1 | 12/2004 | Bachle |
| 2005/0160777 | A1 | 7/2005 | Baechle et al. |
| 2014/0021795 | A1 | 1/2014 | Bhargava et al. |
| 2014/0248801 | A1 | 9/2014 | Riezebos et al. |
| 2015/0318730 | A1 | 11/2015 | Mishriki et al. |
| 2016/0020650 | A1 | 1/2016 | Distelzweig et al. |
| 2016/0301245 | A1 | 10/2016 | Kumar et al. |
| 2017/0098961 | A1 | 4/2017 | Harpham |
| 2017/0237296 | A1 | 8/2017 | Keith et al. |
| 2017/0279313 | A1 | 9/2017 | Tian et al. |
| 2017/0317536 | A1 | 11/2017 | Marson et al. |
| 2017/0338860 | A1 | 11/2017 | Zou et al. |
| 2017/0358185 | A1 | 12/2017 | Hu et al. |
| 2018/0019798 | A1 | 1/2018 | Pisek et al. |

FOREIGN PATENT DOCUMENTS

| | | |
|---|---|---|
| DE | 3736170 A1 | 5/1989 |
| DE | 10215840 A1 | 10/2003 |
| DE | 102004009896 A1 | 9/2005 |
| DE | 10112892 B4 | 12/2007 |
| DE | 102009013694 A1 | 9/2010 |
| DE | 102009013695 A1 | 9/2010 |
| DE | 102010006524 A1 | 8/2011 |
| DE | 102011103318 A1 | 12/2012 |
| DE | 102011107620 A1 | 1/2013 |
| DE | 102011056265 A1 | 6/2013 |
| DE | 102012212254 | 1/2014 |
| DE | 102013004180 A1 | 9/2014 |
| DE | 102013013905 A1 | 2/2015 |
| DE | 102013222227 A1 | 4/2015 |
| DE | 102013113244 A1 | 6/2015 |
| DE | 102014109944 A1 | 1/2016 |
| DE | 102014114640 A1 | 4/2016 |
| DE | 102014116901 A1 | 6/2016 |
| DE | 102015202032 A1 | 8/2016 |
| DE | 102015113723 A1 | 10/2016 |
| DE | 102015211717 A1 | 12/2016 |
| DE | 102016110010 A1 | 11/2017 |
| EP | 1430497 B1 | 11/2005 |
| EP | 1493230 B1 | 3/2009 |
| EP | 2784977 A1 | 10/2014 |
| EP | 2743944 B1 | 2/2017 |
| EP | 3144954 A1 | 3/2017 |
| EP | 3168953 A1 | 5/2017 |
| EP | 2770645 B1 | 1/2018 |
| JP | 2015-522221 A | 8/2015 |
| WO | 2010/119302 A1 | 10/2010 |
| WO | 2013/095940 A1 | 6/2013 |
| WO | 2013/109376 A1 | 7/2013 |
| WO | 2014/116420 A1 | 7/2014 |

OTHER PUBLICATIONS

Authorized Officer: Nora Lindner, English translation of International Preliminary Report on Patentability issued in counterpart PCT application No. PCT/EP2019/072387, dated Mar. 11, 2021, 14 pp.

Office Action issued in Chinese patent application No. 201980055809.5, dated Dec. 30, 2021, 14 pp. w/ translation.

| Kontakte | S-P-S | P-S |
|---|---|---|
| 1 | $R_x+$ | $R_x+/V-$ |
| 2 | $R_x-$ | $R_x-/V-$ |
| 3 | $T_x-$ | $T_x+/V+$ |
| 4 | $V+$ | - |
| 5 | $V+$ | - |
| 6 | $T_x-$ | $T_x-/V+$ |
| 7 | $V-$ | |
| 8 | $V-$ | |

Fig. 2

CONTACTLESS POE CONNECTOR AND CONTACTLESS POE CONNECTION SYSTEM

FIELD

The invention relates to a contactless PoE connector for contactless power and data transfer via a PoE link and to a contactless PoE connection system in which such contactless PoE connectors are used.

BACKGROUND

Power-over-Ethernet technology, or PoE for short, is based on a standardized process for powering network terminal devices via an Ethernet network cable such that a separate power supply cable can be dispensed with. Prior art Power-over-Ethernet (PoE) connectors include in particular RJ45 and M12 sockets and plugs, which can be used to mechanically couple Ethernet cables.

For example, a contactless connector system is known from EP 3 168 953 A1, which has a power transmitting connector and a power receiving connector. The connectors are configured for bidirectional data transfer in which power and data are fed to different interfaces of the power transmitting connector on the input side and consequently are applied to the power transmitting connector already separately from one another. On the output side, power and data are output via different interfaces of the power receiving connector.

The prior art contactless connector system is not suitable for use in a PoE environment.

SUMMARY

The present invention is therefore based on the object of providing a contactless PoE connector and a contactless PoE connection system which can be used to replace prior art plug-in connections for connecting PoE devices in a PoE environment.

The aforementioned technical problem is solved by the features of claim 1, on the one hand.

Accordingly, a contactless PoE connector is provided for contactless power and data transfer via a PoE link. The contactless PoE connector has the following features:

A first contactless interface configured for data transfer, a second contactless interface configured for power transfer, a third interface to which a first Ethernet line can be connected, the third interface being configured to receive data and power that are transferable jointly via the first Ethernet line, a data and power splitting device connected to the first contactless interface, the second contactless interface, and the third interface, which is configured for splitting power and data as applied to the third interface and for selectively supplying data to the first contactless interface and for selectively supplying power to the second contactless interface.

It should be noted that the data and power splitting device performs kind of a splitter functionality.

The PoE connector may preferably comprise means for releasably coupling and aligning the contactless PoE connector with a further contactless PoE connector.

The technical problem mentioned above is furthermore solved by the features of claim 3.

Accordingly, a contactless PoE connector is provided for contactless power and data transfer via a PoE link. The contactless PoE connector has the following features:

A fourth contactless interface configured for data transfer, a fifth contactless interface configured for receiving power coming from a further contactless PoE connector, a sixth interface to which a second Ethernet line can be connected, the sixth interface being configured for feeding data along with power to the second Ethernet line, a data and power combining device connected to the fourth contactless interface, to the fifth contactless interface, and to the sixth interface, which combines the data received via the fourth contactless interface and the power received via the fifth contactless interface to supply them to the sixth interface for being transferred jointly via the second Ethernet line.

It should be noted that the data and power combining device performs kind of a merger functionality in which data and power are combined or merged for being transferred via the second Ethernet line.

According to an advantageous embodiment, the contactless PoE connector comprises means for releasably coupling and aligning the contactless PoE connector with a further contactless PoE connector.

It should be noted here, that each of the first and second Ethernet lines may preferably be in the form of an eight-wire Ethernet cable. Each of the third and sixth interfaces may also be referred to as a wired interface.

Here, it should be pointed out that contactless PoE connector is understood to mean a connector that provides for contactless power and data transfer, i.e. wireless, preferably inductive or capacitive data and power transfer with a further contactless PoE connector.

The technical problem mentioned above is furthermore solved by the features of claim 5.

Accordingly, a contactless PoE connection system is provided for contactless power and data transfer via a PoE link, which comprises the PoE connector according to claim 1 and the PoE connector according to claim 3, wherein in the coupled state of the first and second contactless PoE connectors, the first and fourth contactless interfaces and the second and fifth contactless interfaces are substantially aligned with one another and a releasable connection is established between the first and second contactless connectors, so that power and data can be transferred via the first and second contactless PoE connectors in a contactless manner.

According to an advantageous embodiment it is contemplated that the first and fourth contactless interfaces are each configured for transmitting and receiving data, that the third interface is configured for transmitting data via the first Ethernet line and the sixth interface is configured for receiving data via the second Ethernet line, that the data and power splitting device of the first contactless PoE connector is configured to forward data coming from the second contactless PoE connector to the third interface for transmission over the first Ethernet line, and that the data and power combining device of the second PoE connector is configured to feed data coming from the sixth interface to the fourth contactless interface for transmission.

According to an advantageous embodiment of the contactless PoE connection system, the first and second contactless PoE connectors each have a planar coupling surface with coupling means, the coupling means being configured such that, in the coupled state, the first and fourth contactless interfaces and the second and fifth contactless interfaces are substantially aligned to each other and such that a releasable connection is established between the first and second contactless connectors.

According to an advantageous embodiment, the coupling means each comprise at least one magnet, and the at least one magnet of the first contactless PoE connector and the at least one magnet of the second contactless PoE connector attract each other.

Preferably, the coupling means may each have complementary positioning elements which facilitate the coupling of the connectors.

According to an advantageous refinement of the contactless PoE connection system, a PoE device is connectable to the first Ethernet line, which is configured to transmit and/or receive data via the first Ethernet line and to feed power into the first Ethernet line, and a PoE device is connectable to the second Ethernet line, which is configured to transmit and/or receive data via the second Ethernet line and to draw power via the second Ethernet line.

According to a further advantageous refinement, the PoE device that is connectable to the first Ethernet line may be configured to transfer information to the first contactless PoE connector, which information describes the type of power feed into the first Ethernet line; and the first contactless PoE connector is configured to be responsive to the information representing the type of power feed into the first Ethernet line by feeding the data to the first contactless interface and the power to the second contactless interface in the predefined manner; wherein the first PoE connector is configured to supply the information representing the type of power feed into the first Ethernet line to the second contactless PoE connector; wherein the second contactless PoE connector is configured to be responsive to the information coming from the first contactless PoE connector by supplying the data and power to the sixth interface in the predefined manner. For this purpose, a control and/or evaluation unit can be associated with the data and power splitting device, which control and/or evaluation unit evaluates the information and controls the data and power splitting device accordingly.

It should be noted here, that two types of power supply are to be distinguished, namely spare pair supply and phantom supply.

With spare pair supply technology, the unused wire pairs of the Ethernet line are used for power transfer, in particular wire pairs 4/5 and 7/8. In other words: power and data are transmitted separately via different wire pairs.

With phantom power supply, the data-carrying wires in the Ethernet cable, i.e. wire pairs 1/2 and 3/6, are also used for power transfer. In other words: power and data are transmitted jointly over the same data-carrying wires of the Ethernet cable.

BRIEF DESCRIPTION OF THE DRAWINGS

The invention will now be explained in more detail by way of an exemplary embodiment in conjunction with the accompanying drawings, wherein:

FIG. 2 shows exemplary pin assignments of a prior art PoE connector.

DETAILED DESCRIPTION

Figure 1:
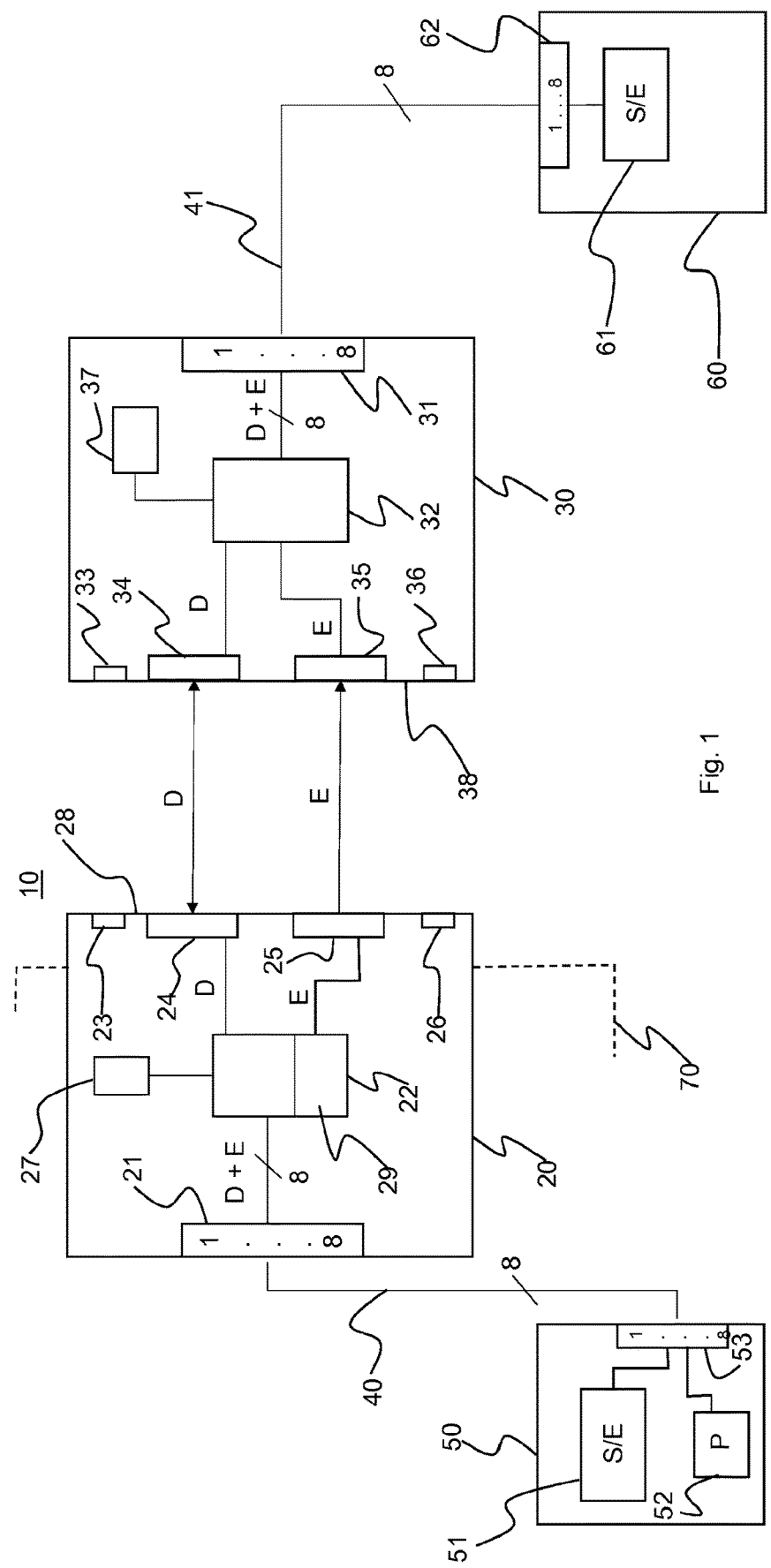
FIG. 1 shows an exemplary contactless PoE connection system comprising two contactless PoE connectors according to the invention.

FIG. 1 shows an exemplary contactless PoE connection system for contactless power and data transfer 10 via a PoE link. The term contactless explicitly means that the data and power transmitted by the Power over Ethernet technology are transmitted inductively and/or capacitively between two contactless PoE connectors.

The exemplary PoE connection system comprises two contactless PoE connectors, namely a first contactless PoE connector 20 and a second contactless PoE connector 30.

The first contactless PoE connector 20 has a first contactless interface 24 which is configured for bidirectional data transfer, for example, and a second contactless interface 25 which is preferably configured for unidirectional power transfer. The two contactless interfaces 24 and 25 are provided on a coupling surface 28 of the PoE connector 20, which essentially is a planar surface. Furthermore, the contactless PoE connector 20 has a third interface 21 to which a first Ethernet line 40 can be connected. The third interface 21, which may also be referred to as a wired interface in contrast to the contactless interfaces 24 and 25, is preferably provided on a side of the PoE connector 20 opposite coupling surface 28.

The first Ethernet line 40 may be a conventional eight-wire Ethernet cable. Accordingly, the third interface 21 preferably has eight terminals which are connected to a respective one of the eight wires of the Ethernet line 40. The third interface 21 is in particular configured for receiving data and power that can be transferred jointly via the Ethernet line 40. At the other end of the first Ethernet line 40, a PoE device 50 may be connected, for example a PoE device comprising a transmitter/receiver 51 for transmitting and/or receiving data via the Ethernet line 40. PoE device 50 may furthermore comprise an internal power supply source 52 which is able to provide the power for a PoE terminal device 60, for example. The transmitter/receiver 51 and the power supply source 52 are connected to an interface 53 of PoE device 50. The interface 53 preferably has eight terminals which can be electrically connected to the transmitter/receiver 51 and to the power supply source 52 in a predefined manner. The way in which the eight terminals can be electrically connected to the transmitter/receiver 51 and to the power supply source 52 depends on the type of power supply selected, for example.

If an eight-wire Ethernet line such as Ethernet line 40 is used for a PoE application, two different types of power supply are known, namely 'spare pair supply' and 'phantom supply'. In the case of spare pair supply, the power provided by power supply source 52, for example, is transferred via the unused wires, which means the wires of Ethernet line 40 that are not used for data transfer, i.e. wire pairs 4/5 and/or 7/8. In the case of phantom supply, the power provided by power supply source 52, for example, is transferred along with the data through the wires of the Ethernet line 40 that are used for data transfer, i.e. through wire pairs 1/2 and/or 3/6. Here, the designation of the wires corresponds to the pin assignment of an RJ45 plug that is used for a PoE application. The associated pin assignment for both types of power supply is illustrated in FIG. 2. This pin assignment also applies to the terminals of interface 53 of PoE device 50, interface 21 of PoE connector 20, interface 31 of PoE connector 30, and interface 62 of PoE device 60.

Contactless PoE connector 20 furthermore comprises a data and power splitting device 22 which is electrically connected to first contactless interface 24, second contactless interface 25, and third interface 21. The electrical connection between third interface 21 and data and power splitting device 22 also comprises eight wires, in correspondence to the Ethernet line 40 used as an example, via which data and power are fed to the data and power splitting device 22. Data and power splitting device 22 functions as kind of a splitter that is configured for separating power and data as applied at the third interface 21, and for selectively supplying data to the first contactless interface 24 and for selectively supplying power, i.e. the transferred current, to the second contactless interface 25.

The two contactless interfaces 24 and 25 may be provided in the form of inductive or capacitive elements, i.e. as antenna coils or capacitor plates, for example. Contactless PoE connector 20 preferably comprises an internal power supply source, for example in the form of a rechargeable battery 27, which powers the data and power splitting device 22, inter alia. Alternatively, data and power splitting device 22 may be powered by the power source 52 of PoE device 50, with power that is transferred from PoE device 50 via Ethernet line 40.

Contactless PoE connector 30 which is complementary to contactless PoE connector 20 has a fourth contactless interface 34 which is preferably configured for bidirectional data transfer, and a fifth contactless interface 35 which is configured for receiving power transferred from the other contactless PoE connector 20. The two contactless interfaces 34 and 35 are provided on a coupling surface 38 of PoE connector 30, which essentially is a planar surface. Contactless PoE connector 30 furthermore has a sixth interface 31 to which a second Ethernet line 41 can be connected. The second Ethernet line 41, too, preferably is an eight-wire Ethernet cable. The two Ethernet lines 40 and 41 can be considered as a PoE link.

Sixth interface 31, which may also be referred to as a wired interface, in contrast to the contactless interfaces 34 and 35, is preferably provided on a side of the PoE connector 30 opposite coupling surface 38. The sixth interface 31 may also have eight terminals that are connected to a respective one of the eight wires of the second Ethernet line 41. Sixth interface 31 is configured to feed data along with power into Ethernet line 41. Furthermore, the second PoE connector 30 comprises a data and power combining device 32 which is electrically connected to fourth contactless interface 34, fifth contactless interface 35, and sixth interface 31. The electrical connection between data and power combining device 32 and sixth interface 31 preferably comprises eight wires corresponding to the eight-wire Ethernet line 41. Data and power combining device 32 is configured for combining or merging the data received via fourth contactless interface 34 and the power received via fifth contactless interface 35 such that they can be jointly transferred to the PoE terminal device 60 via second Ethernet line 41.

In the coupled state of first and second contactless PoE connectors 20, 30, the first and fourth contactless interfaces 24, 34 and the second and fifth contactless interfaces 25, 35 are substantially aligned with each other. It should be noted that in FIG. 1 the two PoE connectors 20 and 30 are still shown in the separated state.

PoE connector 20 may comprise coupling means 23, 26 configured for releasably coupling and aligning the contactless PoE connector 20 with the other contactless PoE connector 30. Similarly, PoE connector 30 may have coupling means or coupling components 33, 36 configured for releasably coupling and aligning the contactless PoE connector 30 with the other contactless PoE connector 20.

The coupling means 23, 26 of PoE connector 20 are provided on coupling surface 28 and may comprise at least one magnet. The coupling means 33, 36 of PoE connector 30 are provided on coupling surface 38 and may comprise at least one magnet. The at least one magnet of PoE connector 20 and the at least one magnet of PoE connector 30 attract each other. Coupling means 23, 26, 33, and 36 ensure that, in the coupled state, the first contactless interface 24 and the fourth contactless interface 34 as well as the second contactless interface 25 and the fifth contactless interface 35 are substantially aligned with each other and a releasable connection is established between the first and second PoE connectors. Additionally, although not illustrated, the respective coupling means of the first and second PoE connectors 20 and 30 may have complementary positioning elements, for example in the form of pins and openings.

It should be noted that the two PoE connectors 20 and 30 are configured for bidirectional data transfer. This can be achieved by configuring each of the first contactless interface 24 of the first PoE connector 20 and the fourth contactless interface 34 of the PoE connector 30 for transmitting and receiving data. Furthermore, the third interface 21 of PoE connector 20 may be configured for transmitting data via the first Ethernet line 40 to PoE terminal 50, while the sixth interface 31 of PoE connector 30 may be configured for receiving data transmitted via the second Ethernet line 41 and for forwarding them to the data and power combining device 32. The data and power splitting device 22 of the first contactless PoE connector 20 may be configured for forwarding, to the third interface 21, data coming from the second contactless PoE connector 30 and being supplied by PoE terminal 60, for example, for transmission over the first Ethernet line 40. The data and power combining device 32 of the second contactless PoE connector 30 may be configured for feeding, to the fourth contactless interface 34, data coming from the sixth interface 31 and being transmitted by PoE terminal device 60, for example, for transmission to the first PoE connector 20. PoE connector 30 and in particular the data and power combining device 32 may be powered by an integrated power supply source 37, for example, or by the external power supply source 52 of PoE device 50, by transferring power from the power supply source 52 via Ethernet line 40 and PoE connector 20 to PoE connector 30.

In order to be able to inform, in an smart manner, the contactless PoE connectors 20 and 30 about the type of power feed by, for instance, PoE device 50 into the first Ethernet line 40, for example according to phantom supply or spare pair supply, the PoE device 50 connected to the Ethernet line 40 may be configured to transmit, to the contactless PoE connector 20, information representing the type of power supply through transmitter/receiver 51 via Ethernet line 40. Other ways of communicating, to the PoE connector 20, the information about the type of power supply that is used are also conceivable. PoE connector 20 may be configured to identify the information received about the type of power supply. For this purpose, a control and/or evaluation unit 29 may be implemented in PoE connector 20, which may be integrated in the data and power splitting device 22 or may be implemented as a separate component, in which case the control and/or evaluation unit 29 is able to communicate with the data and power splitting device 22. The data and power splitting device 22 may be configured to be responsive to the type of power supply as identified by the control and/or evaluation device 29 by supplying the data to the first contactless interface 24 and the power to the second contactless interface 25. Furthermore, the first PoE connector 20 and in particular the control and/or evaluation unit 29 may be configured for communicating the identified type of power supply to the second contactless PoE connector 30. Appropriately, the data and power combining device 32 of the second contactless PoE connector 30 is configured to be responsive to the information about the type of power supply coming from the first contactless PoE connector 24 by feeding the data and the power to the terminals of the sixth interface 31 as defined by the type of power supply that is used.

As illustrated in FIG. 1 by a dashed line, the first contactless PoE connector 20 may be installed in a switch cabinet wall 70, for example, in a waterproof and dustproof manner. This makes it possible, for example, to easily maintain a device accommodated in the switch cabinet and electrically connected to the PoE connector 20 without having to open the switch cabinet. A further advantage of such an application is that it allows to establish a galvanic isolation between a maintenance device and the switch cabinet. This is particularly advantageous for switch cabinets which contain dangerous contact voltages.

At this point it should be noted, that the coupling means 23, 26 and 33, 36 can also be provided in the form of a mechanical lock, for example a bayonet lock.

The operating principle of the contactless PoE connection system 10 as illustrated in FIG. 1 by way of example will now be explained in more detail.

Assuming that the power provided by power supply source 52 in PoE device 50 is to be fed into the Ethernet line 40 by spare pair type supply. As soon as the two PoE connectors 20 and 30 are coupled with each other, the transmitter/receiver 51 transmits corresponding information to the first PoE connector 20, for example via the wire pair 3/4 of Ethernet line 40, which is connected to the corresponding terminals of interface 53, which information is forwarded via interface 21 to the control and/or evaluation unit implemented in data and power splitting device 22, for evaluation. Since the power supply in PoE device 50 is of the spare pair supply type, the control and/or evaluation device of the first PoE connector 20 knows that wire pair 1/2 and wire pair 3/6 of Ethernet line 40, which are connected to the corresponding terminals of third interface 21, receive and transmit data, respectively, and that wire pair 4/5 and wire pair 7/8 of the Ethernet line 40, which are connected to the corresponding terminals of the third interface 21, can be used to transfer power from PoE device 50.

The information about the type of power supply that is used can be transmitted wirelessly via interface 24 to interface 34 and then to the PoE connector 30, preferably to the data and power combining device 32. Data and power combining device 32 can be configured for evaluating the received information. In response to the evaluated information "spare pair supply is used", the data and power combining device 32 then knows that data is transferred to PoE device 60 via the two wire pairs 1/2 and 3/6 of Ethernet line 41, which are connected to the corresponding terminals of the sixth interface 31, and that power is transferred via the two wire pairs 4/5 and 7/8 of the Ethernet connection line 41, which are connected to the corresponding terminals of the sixth interface 31.

Similarly, the two PoE connectors 20 and 30 will identify when power supply is accomplished according to the phantom supply type.

The invention claimed is:

1. A contactless PoE connection system for contactless power and data transfer via a PoE link, comprising:
   a first contactless PoE connector comprising:
      a first contactless interface configured for data transfer;
      a second contactless interface configured for power transfer;
      a third interface to which a first Ethernet line can be connected, the third interface being configured to receive data and power that are transferable jointly via the first Ethernet line;
      a data and power splitting device connected to the first contactless interface, the second contactless interface, and the third interface, and configured for splitting power and data as applied to the third interface and for selectively supplying data to the first contactless interface and for selectively supplying power to the second contactless interface; and
   a second contactless PoE connector comprising:
      a fourth contactless interface configured for data transfer;
      a fifth contactless interface configured for receiving power coming from a further contactless PoE connector;
      a sixth interface to which a second Ethernet line can be connected, the sixth interface being configured for feeding data along with power to the second Ethernet line;
      a data and power combining device connected to the fourth contactless interface, the fifth contactless interface, and the sixth interface, which combines the data received via the fourth contactless interface and the power received via the fifth contactless interface for feeding to the sixth interface for being transferred jointly via the second
   Ethernet line;
   wherein in the coupled state of the first and second contactless PoE connectors, the first and fourth contactless interfaces and the second and fifth contactless interfaces are substantially aligned with each other and a releasable connection is established between the first and second contactless connectors, so that power and data can be transferred via the first and second contactless PoE connectors in a contactless manner,
   wherein a PoE device is connectable to the first Ethernet line, which is configured to transmit and/or receive data via the first Ethernet line and to feed power into the first Ethernet line; and
   a second PoE device is connectable to the second Ethernet line, which is configured to transmit and/or receive data via the second Ethernet line and to draw power via the second Ethernet line, and
   wherein the PoE device that is connectable to the first Ethernet line is configured to transfer information describing the type of power feed into the first Ethernet line to the first contactless PoE connector;
   the first contactless PoE connector is configured to be responsive to the information describing the type of power feed into the first Ethernet line by feeding the data to the first contactless interface and the power to the second contactless interface in a manner predefined by said information;
   the first contactless PoE connector is configured to supply the information describing the type of power feed into the first Ethernet line to the second contactless PoE connector; and
   the second contactless PoE connector is configured to be responsive to the information coming from the first contactless PoE connector by supplying the data and power to the sixth interface in a manner predefined by said information.

2. The contactless PoE connector of claim 1, further comprising:
   means configured to releasably couple and align the contactless PoE connector with a further contactless PoE connector.

3. The contactless PoE connection system of claim 1, wherein:
   the first and fourth contactless interfaces are each configured for transmitting and receiving data;
   the third interface is configured for transmitting data via the first Ethernet line and the sixth interface is configured for receiving data transferred via the second Ethernet line;
   the data and power splitting device of the first contactless PoE connector is configured to forward data coming from the second contactless PoE connector to the third interface for transmission over the first Ethernet line; and
   the data and power combining device of the second contactless PoE connector is configured to feed data coming from the sixth interface to the fourth contactless interface for transmission.

4. The contactless PoE connection system of claim 1, wherein:
   the first and second contactless PoE connectors each have a planar coupling surface with coupling means, the coupling means being configured such that, in the coupled state, the first and fourth contactless interfaces and the second and fifth contactless interfaces are substantially aligned with each other and a releasable connection is established between the first and second contactless connectors.

5. The contactless PoE connection system as claimed claim 1, wherein:
   the coupling means each comprise at least one magnet, and wherein the at least one magnet of the first contactless PoE connector and the at least one magnet of the second contactless connector attract each other.

6. The contactless PoE connection system of claim 5, wherein:
   the coupling means have complementary positioning elements.

* * * * *